United States Patent [19]

Chretien et al.

[11] Patent Number: 5,230,745
[45] Date of Patent: Jul. 27, 1993

[54] THERMOCOUPLE HOUSING

[75] Inventors: Jacques Chretien; Gilles Landry; Rosaire Tremblay, all of Quebec, Canada

[73] Assignee: Alcan International Limited, Montreal, Canada

[21] Appl. No.: 802,880

[22] Filed: Dec. 6, 1991

[51] Int. Cl.⁵ .............................................. H01L 35/02
[52] U.S. Cl. .................................. 136/232; 136/213; 136/230; 136/234
[58] Field of Search ............... 136/202, 213, 230, 232, 136/234

[56] References Cited

U.S. PATENT DOCUMENTS

| | | | |
|---|---|---|---|
| 3,287,176 | 11/1966 | McAlvay | 136/230 X |
| 4,777,844 | 10/1988 | DeBell et al. | 74/579 R |
| 4,871,263 | 10/1989 | Wilson | 136/230 X |
| 5,030,294 | 7/1991 | Burley | 136/232 |
| 5,043,023 | 8/1991 | Bentley | 136/232 |
| 5,071,258 | 12/1991 | Usher et al. | 136/234 X |

FOREIGN PATENT DOCUMENTS

| | | |
|---|---|---|
| 145396 | 12/1980 | German Democratic Rep. |
| 222293 | 5/1985 | German Democratic Rep. |
| 90039471 | 7/1988 | Japan |

*Primary Examiner*—Peter A. Nelson
*Attorney, Agent, or Firm*—Cooper & Dunham

[57] ABSTRACT

A thermocouple housing having a ceramic protection tube with a closed end for immersion into a metal melt and an open end for receiving thermocouple wires. The ceramic protection tube has a reduced diameter portion spaced from the open end by a distance x. A metal protection tube having a threaded end and adapted at an opposite end for attachment to a connection head for electrical connection of the thermocouple wires to a meter for measuring a potential difference between the wires is connected to the ceramic protection tube by an adaptor. The adaptor comprises a hollow body having a through passage which receives the ceramic protection tube at one end and the metal protection tube at an opposite end, the through passage being threaded for coupling to the metal protection tube. A radially inwardly directed shoulder projecting into the through passage is spaced from the threaded end by a distance which exceeds x and is dimensioned so as to accommodate the open end of the ceramic protection tube. A split locating ring is positioned in the reduced diameter portion and abuts on the shoulder. A retaining collar is positioned adjacent the locating ring so as to sandwich the ring between the collar and the shoulder. At least one bore is provided through the collar in alignment with respective corresponding bores in the adaptor body which receive drive pins to secure the collar to the body.

3 Claims, 2 Drawing Sheets

THERMOCOUPLE HOUSING

FIELD OF THE INVENTION

This invention relates to a housing for a thermocouple of the type having a ceramic tube to protect the thermocouple wires upon immersion of the thermocouple, typically in a metal melt, and a metal tube which shields the wires outside the furnace and attaches to a connection head. In particular, this invention relates to the adaptor used for connecting the ceramic tube to the metal tube.

BACKGROUND OF THE INVENTION

It will be appreciated that thermocouples are very often used in extremely hot and chemically harsh environments. The ceramic material selected to make the protection tube for the thermocouple wires must meet demanding physical conditions and therefore the tube is often quite expensive. Because of thermal shock failure or impact failure, tubes made of even the best ceramic will eventually fail. Obviously it is desirable that the replacement tube be easy to attach to the existing adaptor and that this attachment be secure.

The object of this invention is to provide an adaptor which will meet the above described requirements for securing a ceramic protection tube to the metal tube which terminates in the connection head.

SUMMARY OF THE INVENTION

In accordance with this invention, there is provided a thermocouple housing having a ceramic protection tube with a closed end for immersion into a fluid of which the temperature is to be determined and an open end for receiving thermocouple wires The ceramic protection tube has a reduced diameter portion spaced from the open end by a short distance x. A second protection tube open at opposite ends is adapted for attachment to a connection head for electrical connection of the thermocouple wires to a meter for measuring a potential difference between the wires and is connected to the ceramic protection tube by an adaptor. The adaptor comprises a hollow body having a through passage with two ends which receives the ceramic protection tube at one end and the second protection tube at an opposite end. A radially inwardly directed shoulder projecting into the through passage is spaced from the other end of the through passage and is dimensioned so as to accommodate the open end of the ceramic protection tube. A split locating ring is positioned in the reduced diameter portion and is dimensioned to abut on the shoulder while a retaining collar is positioned adjacent the locating ring so as to sandwich the ring between the collar and the shoulder. At least one bore is provided through the collar in alignment with respective corresponding bores in the adaptor body which receive drive pins to secure the collar to the body.

BRIEF DESCRIPTION OF THE DRAWINGS

A preferred embodiment of the invention is described below with reference being made to the accompanying drawings, in which.

DESCRIPTION OF PREFERRED EMBODIMENT WITH REFERENCE TO DRAWINGS

Figure 1:
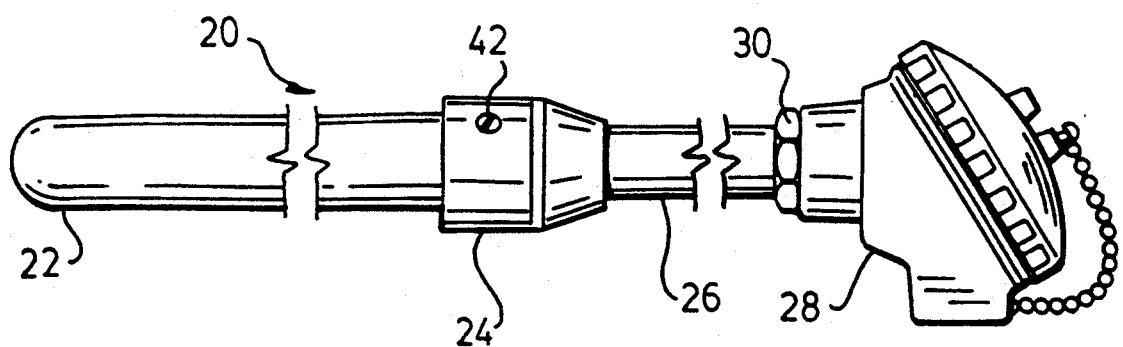
FIG. 1 is a schematic side elevation of a thermocouple housing.

A thermocouple housing generally indicated by numeral 20 in FIG. 1 is included to show those components of the invention which are common in the art. These include a ceramic protection tube 22 which is closed at one and which in use is typically immersed into a metal melt and at the other end is open and received in an adaptor 24. The adaptor 24 connects the ceramic protection tube 22 to a metal tube 26 open at both ends and which terminates at an end remote from the adaptor in a connection head 28. Typically, the metal tube 26 lies outside the furnace wall containing the melt. The connection head 28, commonly die cast from aluminum, is coupled to the metal tube 26 by matching female and male threads (not shown) respectively provided on the head and the tube. A lock nut is threaded on the metal tube 26 adjacent the connection head 28 and is indicated by numeral 30. The opposite end of the metal tube 26 is also threaded.

In use, it will be understood that the housing 20 receives a pair of thermocouple wires which are joined together at one end such that the joint is disposed adjacent the closed end of the ceramic protection tube 22. The wires extend through the housing 20 to the head 28 where they are electrically connected to a meter for measuring the potential difference between the wires so that the temperature of the melt in to which the thermocouple has been immersed may be calculated. A pair of exemplary wires is indicated by numeral 32 in FIG. 2.

Figure 2:
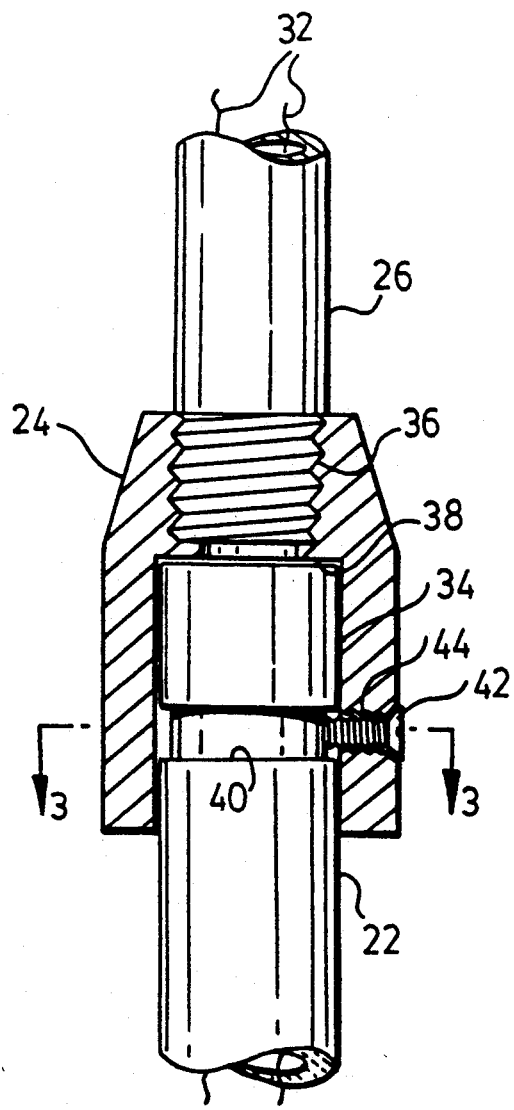
FIG. 2 is a part sectional view (drawn to a larger scale) of the midportion of FIG. 1 and showing the prior art structure of an adaptor for a thermocouple housing.
Figure 3:
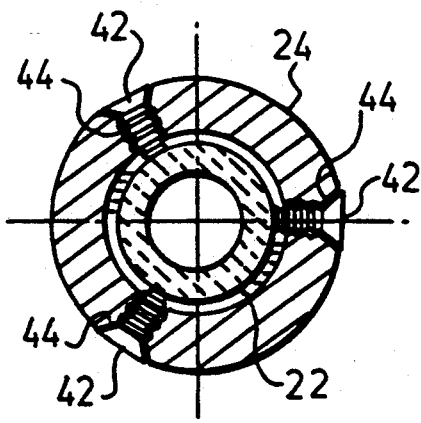
FIG. 3 is a cross-sectional view through line 3—3 of FIG. 2.
Figure 4:
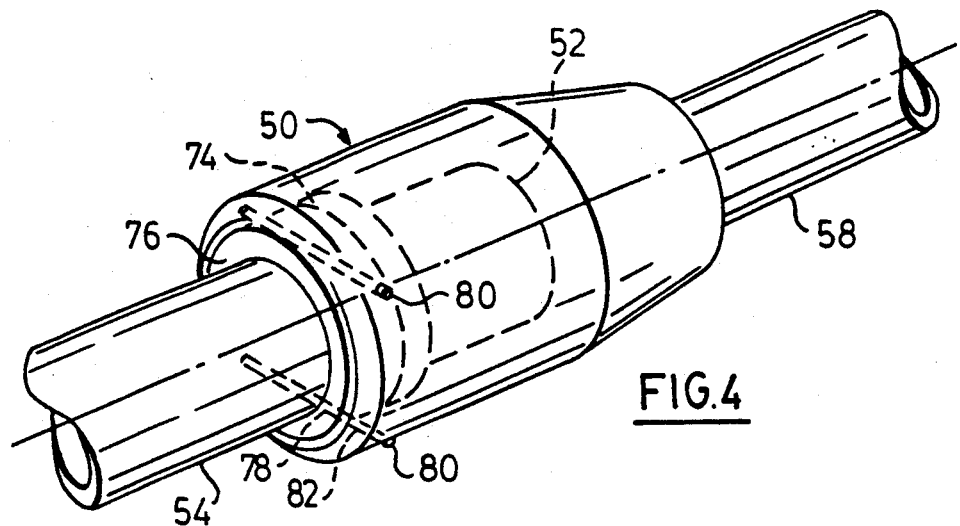
FIG. 4 is a schematic perspective view of an adaptor according to the invention positioned with a ceramic tube at one end and a metal tube at the other end.
Figure 5:
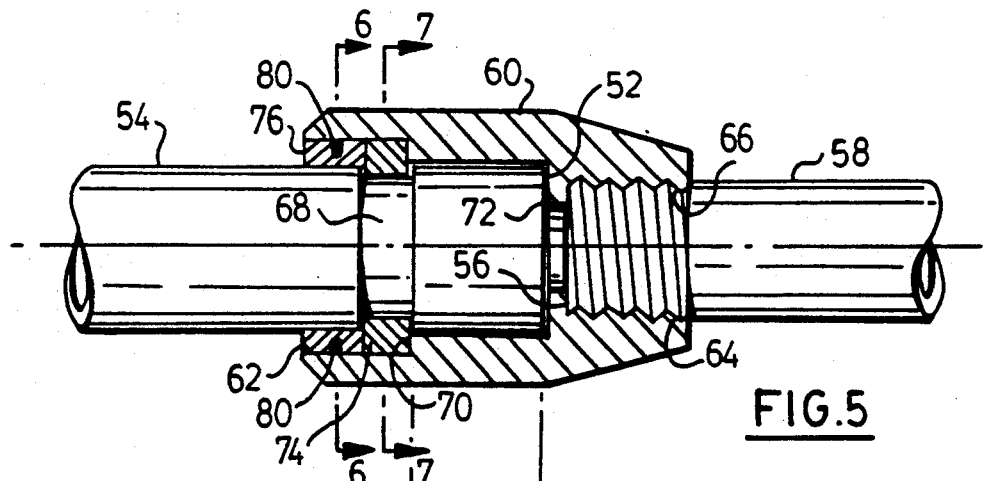
FIG. 5 is a similar view to FIG. 2 showing the adaptor according to the invention.
Figure 6:
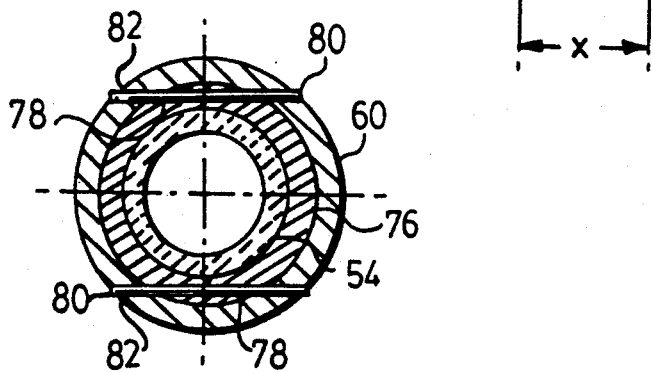
FIG. 6 is a cross-sectional view through line 6—6 of FIG. 5.
Figure 7:
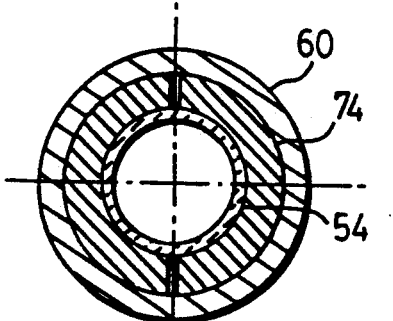
FIG. 7 is a cross-sectional view through line 7—7 of FIG. 5.

The adaptor 24, of the prior art type, is shown to a larger scale in section in FIGS. 2 and 3. It will be seen that the adaptor 24 comprises a hollow body which has a through passage 34 to receive the ceramic protection tube 22 at one end (drawn at the bottom of FIG. 2), and the metal protection tube 26 at the opposite er d (drawn at the top of FIG. 2). The through passage 34 has a threaded end 36 for coupling to the metal tube 26.

The through passage 34 has a radially inwardly directed shoulder 38 adjacent the threaded end 36 against which the ceramic tube 22 abuts. A circumferential groove 40 is formed in the ceramic protection tube 22 near the open end received in the adaptor 24, and three set screws 42 disposed radially at 120° to each other are received in suitable apertures 44 formed in the body of the adaptor 24 are aligned with the groove 40.

The ceramic protection tube 22 is thus held in the adaptor 24 by the set screws 42 pressing against the tube in the groove 40. In practice, this arrangement has been found inadequate because of the screws 42 loosening or bending when submitted to high temperatures. Ceramic tubes 22 have been lost because of inadequate retention by the screws 42 and the adaptors 24 themselves have been damaged upon removal of the screws, thus resulting in the need to replace both the cermaic tube and the adaptor.

An adaptor 50 according to the invention is illustrated in FIGS. 4 to 7 of the accompanying drawings. To withstand the harsh operating conditions and resist the hot corrosive atmospheres, particularly those existing above the molten metal in a holding furnace heated by burning fossil fuels such as oil and natural gas, the body of the adaptor is preferably fabricated from stainless steel e.g. SS316. Like the prior art, the adaptor connects an open end 52 of a ceramic protection tube 54 to a threaded end 56 of a metal protection tube 58 in such a way that thermocouple wires may be received therethrough. The adaptor has a hollow body 60 which has a through passage 62 having a threaded end 64 adapted to couple with the threaded end 56 of the metal protection tube 58.

The ceramic protection tube 54 is like the tube 22 of FIGS. 1 to 3 and has a reduced diameter portion adjacent the open end 52 provided in the form of a groove 68. The groove 68 is spaced from the open end 52 of the ceramic protection tube 54 by a distance represented by x in FIG. 5. The opposite end of the tube 54 is closed.

The through passage 62 has a first radially inwardly directed shoulder 70 spaced from a second shoulder 72 which likewise extends radially inwardly into the passage 62. The separation between the shoulders 70, 72 exceeds x so as to accommodate the open end 52 of the ceramic protection tube 54. In use, the open end 52 abuts against the second shoulder 72.

A split locating ring 74 also made of stainless steel 316 locates in the groove 68 and abuts against the first shoulder 70. A retaining collar 76 sandwiches the ring 74 between the collar and the first shoulder 70. The collar has a pair of bores 78 located on opposite sides thereof which each receive a drive pin 80. Corresponding bores 82 aligned with the bores 78 are provided in the body 60 of the adaptor and receive the outer ends of the drive pins 80.

Figure 8:
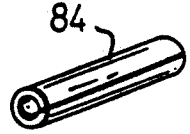
FIG. 8 is a perspective view drawn to a large scale of a C-section pin for use in the adaptor according to the invention.

The drive pins 80 are shown in the drawings as having a solid cross-section. An alternative embodiment of the invention drawn in FIG. 8 shows a drive pin 84 having a C-section so as to be compressible upon insertion into the bores.

In use, thermocouple wires joined at one end and normally insulated from each other along their lengths are placed inside the ceramic protection tube 54 for location against the closed end (not shown in the drawings). The split location ring 74 is placed in the groove 68 of the ceramic protection tube of which the open end 52 is then introduced in the through passage 62 of the adaptor body 60 such that the locating ring 74 abuts against the first shoulder 70. There will be some play between the locating ring 74 and the groove 68. If the distance x between the groove 68 and the open end 72 approximates the separation between the shoulders 70, 72, the open end 52 of the ceramic protection tube 54 may abut against the second shoulder 72. The assembly is then secured in place by introducing the retaining collar 76 such that the bores 78 align with the bores 82 of the adaptor body 60 and the drive pins 80 are gently tapped in with a hammer. The metal protection tube 58 is then inserted over the wires and coupled to the adaptor at the threaded end 56. The thermocouple wires are pulled through a thermocouple connection head which is threaded to the other end of the metal protection tube 58. From the connection head, an electrical connection is established between the wires and a suitable meter provided for measuring the potential difference between the wires.

It will be appreciated that the ceramic protection tube 54 is rotatably supported within the adaptor 50 and is depending on dimensional tolerances, movable longitudinally relative to the adaptor. While the ceramic protection tube 54 may move only slightly within the adaptor 50, such freedom of movement is sufficient to allow the tube 54 to withstand small displacements resulting from thermal stresses and physical contact with other objects. In the prior art adaptor 24, the ceramic protection tube 22 is rigidly held in position relative to the adaptor body 24 by the set screws 42 and therefore has no freedom of movement with obvious undesirable consequences.

It has also been found that with the adaptor 50 according to the invention, the ceramic protection tube 54 may easily be removed from the adaptor by pushing out the drive pins 80 with the aid of a hammer and a punch. With the prior art adaptor 24, the removal of the set screws 42 which are damaged because of the severe environment in which thermocouples are used is often difficult and may result in damage to the adaptor body itself making the body unsuitable for reuse. Such problems have not been encountered with the adaptor according to the invention.

It will be understood that several variations may be made to the above described embodiment of the invention within the scope of the appended claims.

We claim:

1. In a thermocouple housing having a ceramic protection tube with a closed end for immersion into a fluid of which the temperature is to be determined and an open end for receiving thermocouple wires, the ceramic protection tube having a reduced diameter portion spaced from the open end; a metal protection tube open at opposite ends and adapted at one end for attachment to a connection head for electrical connection of the thermocouple wires to a meter for measuring a potential difference between the wires; and an adaptor for connecting the open end of the ceramic protection tube to the other end of the metal protection tube to allow the thermocouple wires to pass therebetween, the improvement wherein the adaptor comprises;

a hollow body having a through passage with two ends and adapted at one end for coupling to the metal protection tube, a first radially inwardly directed shoulder being spaced from the other end and dimensioned so as to accomodate the open end of the ceramic protection tube therein;

a split locating ring positioned in said reduced diameter portion of the ceramic protection tube and dimensioned to abut on said shoulder;

a retaining collar positioned adjacent said locating ring so as to sandwich the ring betweeen the collar and the shoulder, the collar having at least one bore therethrough; and respective corresponding bores in the hollow body in alignment with said at least one bore in the collar and receiving therethrough a drive pin securing the collar to the adaptor body.

2. A thermocouple housing according to claim 1 in which the reduced diameter portion of the ceramic protection tube is an annular groove.

3. A thermocouple housing according to claim 1 in which the reduced diameter portion is spaced from the open end of the ceramic protection tube by a distance x and the adaptor has a threaded end for coupling to the metal protection tube, the first radially inwardly directed shoulder being spaced from a second radially inwardly directed shoulder between the first radially inwardly directed shoulder and the threaded end by a distance exceeding x so as to accomodate the open end of the ceramic protection tube therebetween.

* * * * *